UNITED STATES PATENT OFFICE.

WILHELM LANWER AND ERNST RÜPING, OF BREMERHAVEN, GERMANY.

PROCESS OF COATING FOODS.

SPECIFICATION forming part of Letters Patent No. 643,359, dated February 13, 1900.

Application filed August 11, 1899. Serial No. 726,937. (No specimens.)

*To all whom it may concern:*

Be it known that we, WILHELM LANWER, chemist and apothecary, of Mittelstrasse 20, and ERNST RÜPING, apothecary, of Karlsburg 4, Bremerhaven, in the Empire of Germany, have invented certain new and useful Improvements in Processes of Preserving Perishable Food and other Materials Against Infection and Atmospheric and other Influences, of which the following is a specification.

Many attempts have been made to protect meat, fruits, and other provisions against infection, as well as against destructive atmospheric influences and evaporation or exudation of fluids. For preserving provisions carbonic acid, common salt, and other means have been used. Means of preservation have also been tried consisting in a coating surrounding such goods—for example, by covering them with a layer of paraffin or gelatine, or impregnating them with a dilute formaline solution, or by keeping them in impregnated sacks, boxes, or the like; but none of these known processes can so far protect provisions thus against infection and outer influences that they remain fresh for several months and do not get dry. The direct use of formaline solution brings it into contact with the provisions, and in meat, for instance, by its deep penetration into it, it causes a hardening of the albuminous matter. The use of gelatine forms a favorable medium for the development of bacteria, and a paraffin layer cracks or breaks, especially when used on large pieces of meat or the like when they are packed or forwarded.

The present invention relates to a process of providing provisions to be preserved with a resistant and insoluble layer, protecting them against the influence of temperature, weather, and mechanical injury in packing, infection from outside, and against evaporation and exudation or drying out. The inclosing of the provisions is done in sterile condition.

The essential feature of the new process is that the provisions do not come into direct touch with any preserving means. For this purpose such provisions as contain much juice and are not protected on their outside by a closed skin—as, for instance, fresh meat, fresh fruits, and the like—are treated as follows: The object to be inclosed is first rendered sterile on its outside, is simultaneously provided with a thin impervious fat layer, indifferent to all agencies, by dipping it in boiling fat—as, for instance, paraffin, stearin, ceresin, palmitin, or the like—and then into a mineral fat cooled to about 90° centigrade, so that the first thin sterilizing-layer is provided with a thicker one. The impervious fatty layer prevents or delays, for instance, in fresh meat, contact between the juices, blood, and the like exuding in time to the surface and the next following artificial skin, because otherwise the presence of liquid would render the hardening of the next following skin very difficult and the formation of mold would be favored. After the paraffin or the like layer has set the object is dipped into an alcoholic solution of resin in order to render the paraffin or other fatty layer receptive for the following aqueous solution. After the alchohol has evaporated the object is dipped into a solution consisting, essentially, of gelatine, glue, and dextrine in order to protect the layer of paraffin or the like against outer mechanical influences and to provide it also with an elastic resistant skin. Thereupon the object is dipped for about one minute into a five-per-cent. formaline solution, the latter sterilizing and hardening the skin formed, as above mentioned, of glue, gelatine, and dextrine solution. After treatment in the formaline-bath the object may receive further layers of gelatine, glue, and dextrine, and finally it is exposed again for about five minutes in the formaline-bath for the same purpose and then dried in a suitable drying-room for about forty-eight hours in a temperature of, say, 30° to 40° centigrade. All other provisions can be manipulated in the same manner.

In wrapping up such provisions which are not so rich in juice or possess a tight covering—as, for instance, sausages, fruits in their shells, or hard skins and the like—the use of paraffin and the like can be omitted, because the juice of the object does not influence the next following covering, and can therefore not prevent its hardening. The object first is dipped for sterilizing of the surface, for, say, two minutes, into boiling water and then immediately into the solution of glue, gelatine, and dextrine. Then the object is treated in the above-mentioned manner with the formaline-bath and a further covering of glue, gelatine, and dextrine applied, and so on. Instead of the solution consisting of gelatine, glue, and dextrine any other liquid consisting of equivalent substances can be used.

The solution of gelatine, glue, and dextrine or equivalent substances and the following hardening can also be used for various articles of manufacture—as, for instance, paper, turf, wood, and similar objects—which are to be rendered resistant against outer influences by outside impregnation.

Having thus described our invention, the following is what we claim as new therein and desire to secure by Letters Patent:

1. The process for preserving perishable articles which consists in sterilizing the object, then dipping it into an alcoholic solution of resin and permitting the alcohol to evaporate, then dipping it into a solution of gelatine, glue and dextrine, then dipping it into a solution of formaline and finally placing it in a drying-room at a temperature of between 30° to 40° centigrade.

2. The process of preserving perishable articles which consists in sterilizing the object, then dipping it in fat, then dipping it into an alcoholic solution of resin and permitting the alcohol to evaporate, then dipping it into a solution of gelatine, glue and dextrine, then dipping it into a solution of formaline and finally placing it in a drying-room at a temperature of between 30° to 40° centigrade.

In witness whereof we have hereunto set our hands in presence of two witnesses.

WILHELM LANWER.
ERNST RÜPING.

Witnesses:
GEORG SCHIPPIR,
DAPHIL. FRIEDR. PURLITZ.